May 24, 1966 C. B. GWYN, JR 3,252,207
PROCESS OF MAKING PROJECTION WELDING
TYPE COMPOSITE CONTACTS
Original Filed Nov. 16, 1960
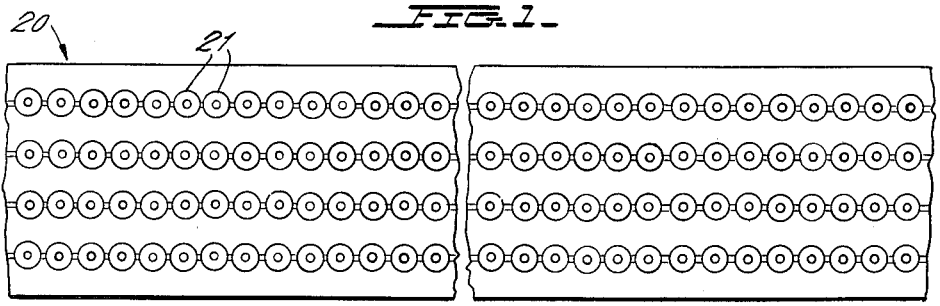
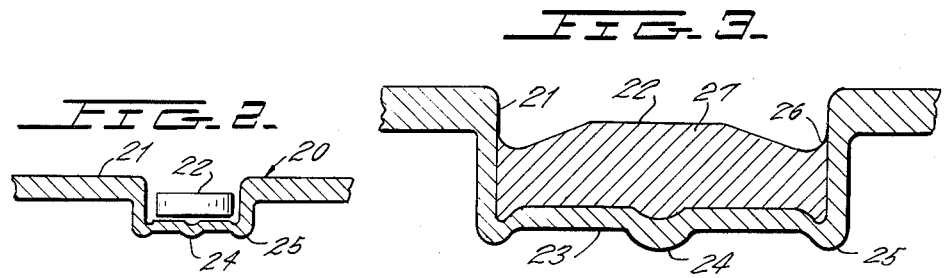
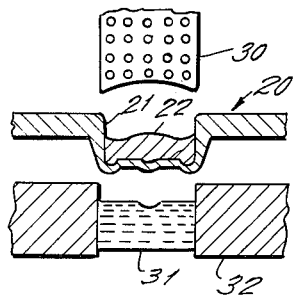
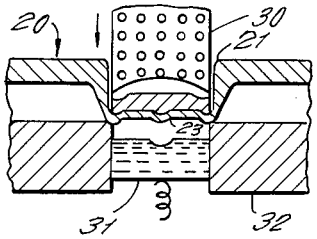
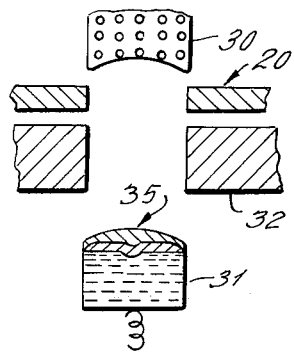
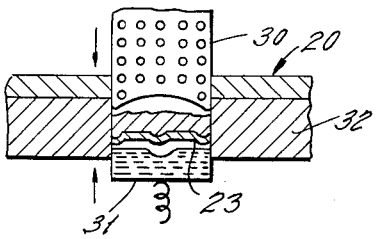
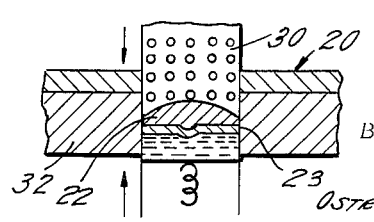
INVENTOR.
CHILDRESS B. GWYN, JR.
BY
OSTROLENK, FABER, GERB & SOFFEN
ATTORNEYS

United States Patent Office 3,252,207
Patented May 24, 1966

3,252,207
PROCESS OF MAKING PROJECTION WELDING
TYPE COMPOSITE CONTACTS
Childress B. Gwyn, Jr., Export, Pa., assignor, by mesne
assignments, to Talon, Inc., a corporation of Pennsylvania
Original application Nov. 16, 1960, Ser. No. 69,639, now Patent No. 3,191,273, dated June 29, 1965. Divided and this application Dec. 4, 1964, Ser. No. 425,986
1 Claim. (Cl. 29—155.55)

This application is a division of my co-pending application, Serial Number 69,639, filed November 16, 1960, and now United States Patent 3,191,273.

The present invention relates to processes for making projection welding type composite contacts, and more particularly to such contacts in which a steel backing member is indented and has elements of contact element material placed therein.

A highly satisfactory type of electrical contact is one having a backing or support of relatively hard material, such as steel, with one face of this backing or support carrying a contact made of silver or the like. Such a contact is shown in my prior Patent No. 2,199,240.

Several methods are known by which the above described contact can be made. In one known method, a button is provided by blanking and forming a contact from a sheet of clad or overlay material. That is to say, the initial sheet may comprise steel with an overlay of silver. The contact produced by this method is of satisfactory quality, but the method has many disadvantages, among which are a high scrap loss. In addition, in this method, tolerances, materials temper and ratios of component materials must be held to very exacting limits. These requirements further increase the cost of the end product, so that all in all, this process is a relatively expensive one.

In another known process, the backing metal members are first blanked or formed from steel strip, are then electroplated with nickel, copper or the like, where desired, and then subsequently deposited into refractory boats or jigs. The desired contact facing material, such as silver, is then blanked from a sheet and placed upon the surfaces of the steel backing members, which are usually disks, and then the refractory boat or jig, loaded as described, is heated in an oven in order to fuse the silver contact element to the steel backing member. This process, which is described in my Patent No. 2,049,771 has been found to require a relatively large heating source, because of the refractory boat or jig. Since these boats or jigs generally are made of or contain carbon or graphite mixtures, the steel backing members absorb some of the carbon, and this results in embrittlement, blistering, peeling, etc. In addition, it has been found that the contact facing material does not uniformly flow over the surface of the backing member, in all cases, and this results in final products which have only a thin facing of contact material near the outer edges thereof.

An object of the present invention is to provide a process for manufacturing composite contacts of satisfactory quality with economy of cost.

Yet another object of the present invention is the provision of a process for making composite contacts in which the use of refractory boats or jigs is eliminated.

A further object of the present invention is to provide a process which will require the consumption of less heat than heretofore in order to manufacture composite contacts.

A still further object of the present invention is the provision of a process for making composite contacts which will avoid the absorption of carbon or graphite, and thereby eliminate the production of contacts that are brittle, subject to blistering, peeling, etc.

Another object of the present invention is to provide a process for making composite contacts in which the contacts produced will have a suitably thick and uniform facing of contact material.

Other objects and many of the attendant advantages of the present invention will be readily understood from the following specification and drawings, wherein:

FIGURE 1 is a plan view of a blank of weldable base material prepared in accordance with the invention.

FIGURE 2 is a cross-sectional view showing the deposition of a contact element in the sheet of FIGURE 1.

FIGURE 3 is an enlarged cross-sectional view of the structure shown in FIGURE 2, after heating.

FIGURES 4 through 8 are cross-sectional views illustrating successive steps in the removal of an individual contact from the backing material strip.

FIGURE 9 is a cross-sectional view of the product produced by this process.

Referring now to the drawings, wherein like or corresponding reference numerals are used to designate like or corresponding parts throughout the several views, there is shown in FIGURE 1 a sheet 20 of weldable base material, such as steel. Sheet 20 may be of any length, and in practice the length of sheet or strip 20 is limited only by production and transportation factors. The sheet 20, which will be understood to be a blank, has therein a plurality of indentations 21, the indentations 21 being produced by known embossing or coining operations and being circular in the embodiment shown. There are a great number of the indentations 21 provided in the sheet 20, so that production may proceed at a rapid rate.

Referring now to FIGURE 2, there may be seen in cross-section a part of the sheet 20, the indentation 21 being shown as having placed therein a button or contact element 22 which is, conventionally, of silver. Whatever the materials of the sheet 20 and element 22, it will be understood that the element 22 will have a lower melting point than the sheet 20. It will be observed that the bottom wall 23 of indentation 21 has a central depression 24 and a peripheral depression 25.

The entire sheet 20, or a suitable portion thereof, is, after being loaded with the elements 22, passed into a furnace, the heat of which melts the element 22, and after cooling there is obtained a structure having the configuration shown in FIGURE 3. It will be noted that the element 22 has melted and has filled the indentations 24 and 25, and that the silver element 22 has crept up the walls of the indentation 21 as is indicated at 26. There is also a convex upper surface 27 of the melted and solidified element 22.

Subsequent to the removal of the sheet 20, or a portion thereof, from the furnace, the steel strip may be passed to a conventional punch press where the individual indentation 21 with the melted and solidified element 22 will come under a punch 30 which is above a coining die 31 in a die body 32. Punch 30 and die body 32 will be caused to move towards each other, viewing FIGURE 4, the action continuing as shown in FIGURE 5 wherein it may be seen that the punch 30 has moved into contact with the sheet 20, entering into the identation 21, while the coining die 31 has moved into position to receive that material which will be punched from the sheet 20, and comprising the melted and solidified contact element 22, together with the indentation bottom wall 23.

FIGURE 6 shows the shearing action completed, with separation of the parts from sheet 20 and FIGURE 7 shows the further progression of punch 30 which now compresses the sheared element 22 and bottom wall 23 against the coining die 31 in die body 32. FIGURE 8 shows the upward movement of punch 30, and the downward movement of coining die 31, carrying with it the completed composite contact 35. Contact 35 is shown in FIGURE 9, after having been removed from the coining die 31 as by blowing or the like, and may be seen to comprise a backing member 36 having a central button 37, to the upper surface of which is fused a generally arcuate silver contact element 38, it being understood that the element 38 was formerly the element 22 and that the backing member 36 formerly was the bottom wall 23 of indentation 21.

It will be understood, of course, that while the upper surface of element 38 is shown convex, and that this is due to the shape of the punch, 30, this shape is given by way of illustration only and where other shapes are desired the punch 30 may be provided with such other shapes.

In the process above disclosed, due to the fact that the indentations may be made and loaded in such large quantities and with such great rapidity as is provided by fast operating punching machines, the production of composite contacts may proceed at an extremely rapid rate. This will substantially reduce the cost of the end product. Further, since it is unnecessary to provide jigs or boats which will consume heat and contaminate the contact elements, there is a further advantage in the economy of production and quality of the end product.

It will be obvious to those skilled in the art that various changes may be made without departing from the spirit of the invention and, therefore, the invention is not limited to what is shown in the drawings and described in the specification, but only as indicated in the appended claim.

I claim:

A process of making a projection welding composite electrical make-and-break contact comprising (a) placing a silver contact facing element in an indentation in a blank of weldable steel base material having a higher melting point than the material of the facing element, said indentation including a bottom wall having a central concave-shaped depression and a peripheral concave-shaped depression formed therein;

(b) heating said base material and said facing element to liquefy said facing element and cause the material thereof to flow along the walls of the indentation and fuse to the abutting base material, the surface of the fused facing element remote from the bottom wall of said indentation being convex in shape and having a peripheral edge portion defining a concave meniscus within said indentation;

(c) moving a concave-shaped punch against the resulting composite fused element with a force sufficient to shear the same from the remainder of the blank of weldable base material and with continuous progression of said punch compressing the sheared composite fused element between said punch and a coining die disposed adjacent the base material portion of said sheared composite fused element and having a concave central depression, to form the desired contact having a facing element of substantially uniform thickness.

References Cited by the Examiner
UNITED STATES PATENTS

| | | | |
|---|---|---|---|
| 2,137,617 | 11/1938 | Imes et al. | 29—155.55 |
| 2,545,352 | 3/1951 | Gibbs | 29—155.55 |
| 2,953,247 | 9/1960 | Walter et al. | 29—155.55 X |

References Cited by the Applicant
UNITED STATES PATENTS

| | | |
|---|---|---|
| 1,130,077 | 3/1915 | Eldred. |
| 2,049,771 | 8/1936 | Gwyn. |
| 2,715,169 | 8/1955 | High. |
| 2,744,180 | 5/1956 | Sullivan. |
| 2,832,127 | 4/1958 | Felts et al. |
| 2,925,647 | 2/1960 | Jones et al. |

JOHN F. CAMPBELL, *Primary Examiner.*

WHITMORE A. WILTZ, *Examiner.*

R. W. CHURCH, *Assistant Examiner.*